United States Patent [19]

Diephuis et al.

[11] Patent Number: 4,699,170
[45] Date of Patent: Oct. 13, 1987

[54] CARTRIDGE FOR FAUCET VALVE

[75] Inventors: Peter W. Diephuis; Arthur D. Thompson, both of London, Canada

[73] Assignee: EMCO Limited, London, Canada

[21] Appl. No.: 22,608

[22] Filed: Mar. 4, 1987

Related U.S. Application Data

[63] Continuation of Ser. No. 858,655, May 2, 1986, abandoned, which is a continuation-in-part of Ser. No. 727,723, Apr. 26, 1985, abandoned.

[51] Int. Cl.$^4$ ............................................. F16K 1/02
[52] U.S. Cl. ................................ 137/454.5; 251/266
[58] Field of Search ............... 137/454.2, 454.5, 454.6; 251/266

[56] References Cited

U.S. PATENT DOCUMENTS

| Re. 868 | 12/1859 | Stebbins | 251/266 |
| 696,434 | 4/1902 | Hedges | 251/266 X |
| 3,006,361 | 10/1961 | Reinemann | 137/454.5 |
| 3,022,797 | 2/1962 | Allin | 137/454.5 |
| 3,082,786 | 3/1963 | McLean | 137/454.5 |
| 3,389,717 | 6/1968 | Povalski | 137/454.5 X |
| 4,245,667 | 1/1981 | Braukmann | 137/454.5 X |

FOREIGN PATENT DOCUMENTS 2320418 10/1974 Fed. Rep. of Germany ...... 251/266

Primary Examiner—Robert G. Nilson
Attorney, Agent, or Firm—Fetherstonhaugh & Co.

[57] ABSTRACT

This invention relates to a valve assembly that has a seat for the flow control seal that is contained on a sleeve-like seating assembly that sits upon a shoulder in the housing whereby the extension of the seating assembly beyond the lower end of the housing in a downward and axial direction is fixed. This construction insures that the seat for the flow control valve must be withdrawn from the faucet body with the rest of the valve assembly.

1 Claim, 3 Drawing Figures

CARTRIDGE FOR FAUCET VALVE

This application is a continuation of application Ser. No. 858,655, filed May 2, 1986, now abandoned, which, in turn, is a continuation-in-part of application Ser. No. 727,723, filed Apr. 26, 1985, now abandoned.

This invention relates to a cartridge valve assembly for a faucet body.

Cartridge valve assemblies for faucet bodies are not broadly new. They have been popular for several years and have the advantage that all working parts of the unit can be easily replaced without disturbing the connections of the faucet body. Replacement of the faucet body usually requires the services of an experienced tradesman whereas replacement of a cartridge can be done by the householder.

As well as being reliable, there is a requirement that the cartridge valve assemblies be simple to remove when worn so that the average householder, doing an occasional plumbing repair, is able to easily replace the assembly without having to resort to outside help.

One of the difficulties of prior cartridge valve assemblies is that they are either two pieces or separable in the direction of withdrawal into two pieces, the lowermost piece in both cases being the flow control seat member. This creates the possibility that when the householder attempts to remove the valve assembly from the faucet body, the flow control seat member will remain behind in the faucet body.

If the flow control seat member remains in the faucet body after the rest of the valve assembly is removed, the householder who is a non-expert in plumbing will likely experience difficulty. The householder may not realize that there is a part of the valve assembly still in the faucet body and, in that case, will find that his replacement unit will not fit. If the householder is able to figure out that there is a part of the valve assembly still in the faucet body, he is then faced with the problem of "fishing" out the remaining member without available proper tools. Therefor, this separation of valve assembly parts that can occur when the householder attempts to remove the valve assembly from the faucet body is a problem because it makes the removal and replacement of the valve assembly more difficult to accomplish.

It is an object of this invention to provide a cartridge valve assembly that prevents the separation of the valve-assembly components when the cartridge valve assembly is being removed from a faucet body.

The valve assembly of this invention has a seat for the flow control seal that is contained on a sleeve-like seating assembly that sits upon a shoulder in the housing whereby the extension of the seating assembly beyond the lower end of the housing in a downward and axial direction is fixed. This construction insures that the seat for the flow control valve must be withdrawn from the faucet body with the rest of the valve assembly.

According to one aspect of the present invention, a cartridge valve assembly for mounting in a faucet body comprises: a housing; a seal holder reciprocably mounted for movement axially of itself in the housing; an elastomeric seal with a sealing surface on the seal holder; a seat in the housing having a complementary annular seating surface for said seal; a stem mounted in the housing for rotation but not axial movement; the stem and seal holder are in threaded engagement with each other whereby upon rotation of the stem in the housing the seal holder reciprocates in the housing and the seal can be caused to seat and unseat on the seating surface of the seat; the housing has a through flow passage circumscribed by the annular surface of the seat only when the seal is unseated from the seat; sealing means adjacent the upper end of the housing compressible upon mounting the cartridge valve assembly in a faucet body for sealing the cartridge valve assembly against the walls of a faucet body; the seat being formed on a sleeve-like seating assembly; the housing being sleeve-like; the seating assembly being contained by and extending downwardly and axially of the lower end of the housing; the extension of the seating assembly beyond the lower end of the housing is determined by an inwardly directed shoulder on the inside of said sleeve-like housing upon which the seating assembly sits, the shoulder being a positive stop means to limit the extension of the seating assembly downwardly and axially of the lower end of the housing; sealing means adjacent the lower end of said sleeve-like assembly compressible upon mounting the cartridge valve assembly in a faucet body for sealing the sleeve-like assembly of the cartridge valve assembly against a faucet body; the stem has a round flange; seating means on the interior of the housing for the round flange whereby the stem is mounted for rotation as aforesaid.

The invention will be clearly understood after reference to the following detailed specification read in conjunction with the drawings.

Figure 1:
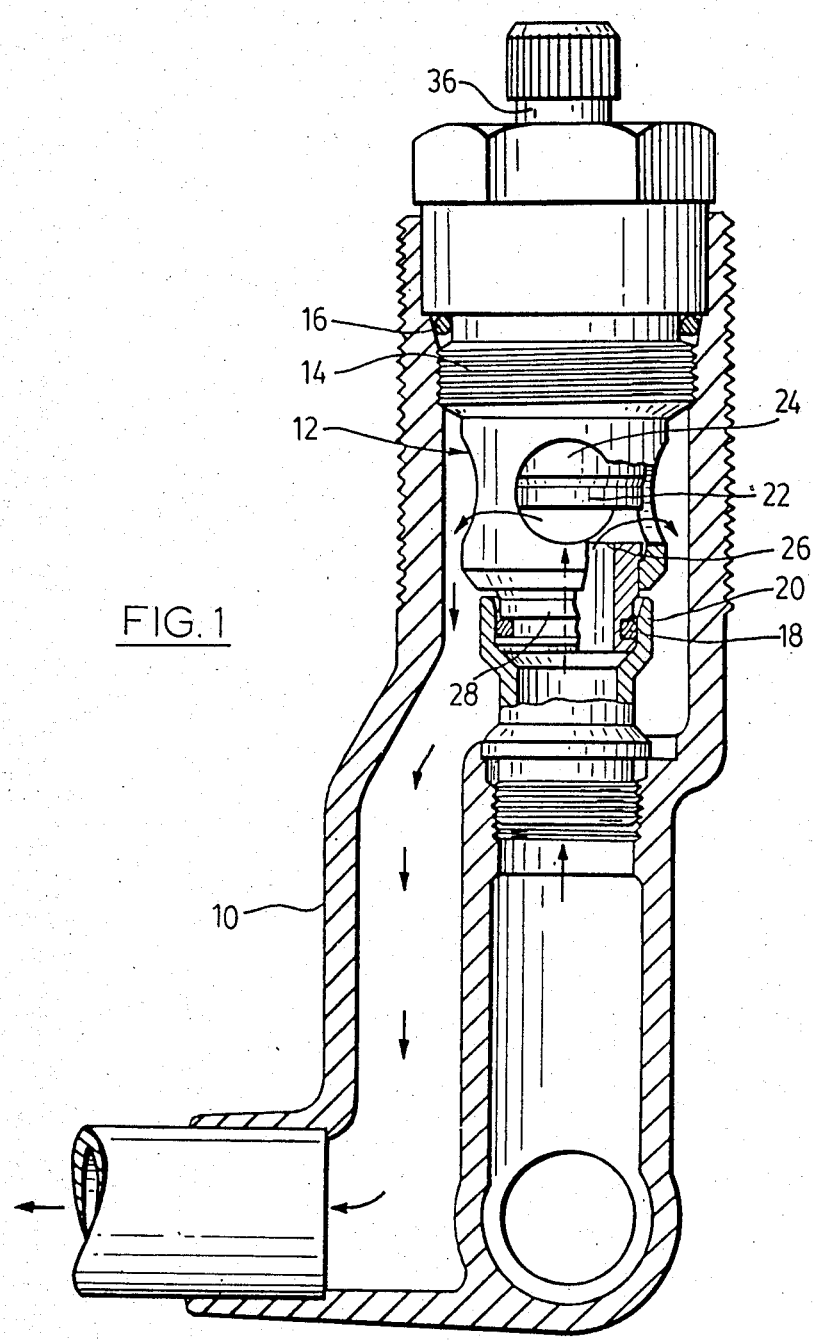
FIG. 1 is a partially sectional view of a faucet body with a cartridge valve in the open position mounted therein.

In the drawings FIG. 1 illustrates a faucet body 10 with a cartridge valve generally indicated by the numeral 12 mounted therein. The general arrangement of faucet body and cartridge valve is well known and in use water flows into the faucet body through the cartridge valve assembly and out the faucet in the general direction of the arrows on FIG. 1.

The cartridge valve housing 12 is threaded as at 14 for threaded engagement in the faucet body 10 as illustrated in FIG. 1. As it is threaded into the body an O-ring seal 16 is compressed and an O-ring seal 18 engages in the seat extension 20 of the faucet body 10 to seal the cartridge so that it can control flow through the faucet body as the flat seal member 22 on the seal holder 24 is raised and lowered with respect to the annular seating surface 26 of the seating assembly 28. It will be apparent that the seat extension is to accommodate the outside dimensions of the casing and that in other cartridges it will not be necessary.

The seal holder 24 has an upper portion that is hexagonal in cross-section that is a slide fit in a portion 25 of the cartridge valve housing that is also of hexagonal cross section and that guides the seal holder longitudinally of the housing. The hexagonal cross-sections at the upper portion of the seal holder and of the housing prevent rotation of the seal holder within the housing and limit the movement of the seal holder to longitudinally of the body. The lower portion of the seal holder is round in crosssection and an O-ring seal 34 contained within a groove in the housing provides a seal between the seal holder 24 and interior of the housing.

Figure 2:
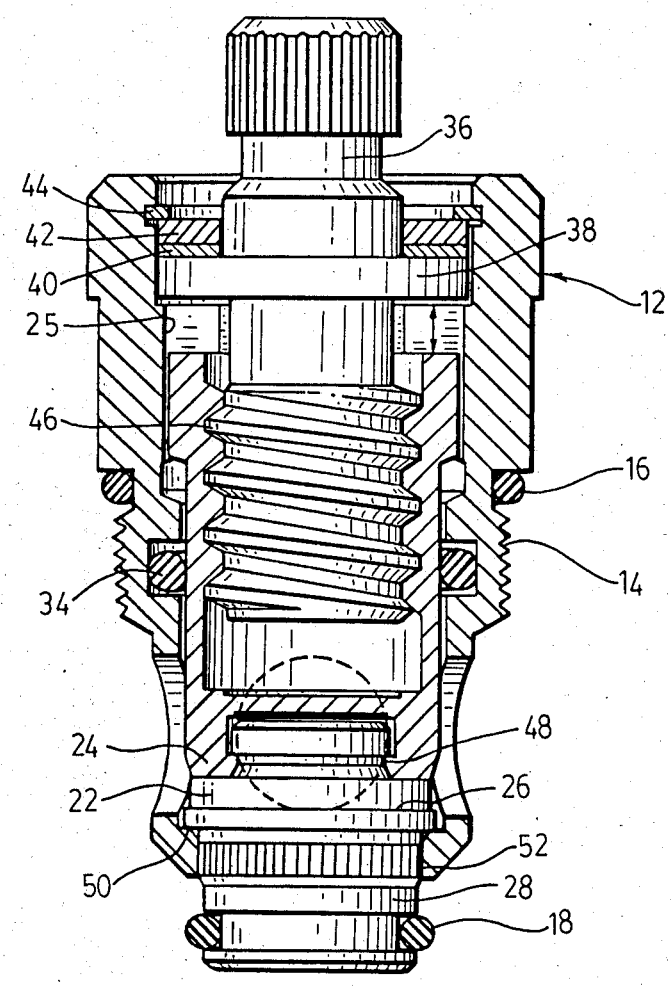
FIG. 2 is a partially sectional view of the cartridge valve in the closed position.
Figure 3:
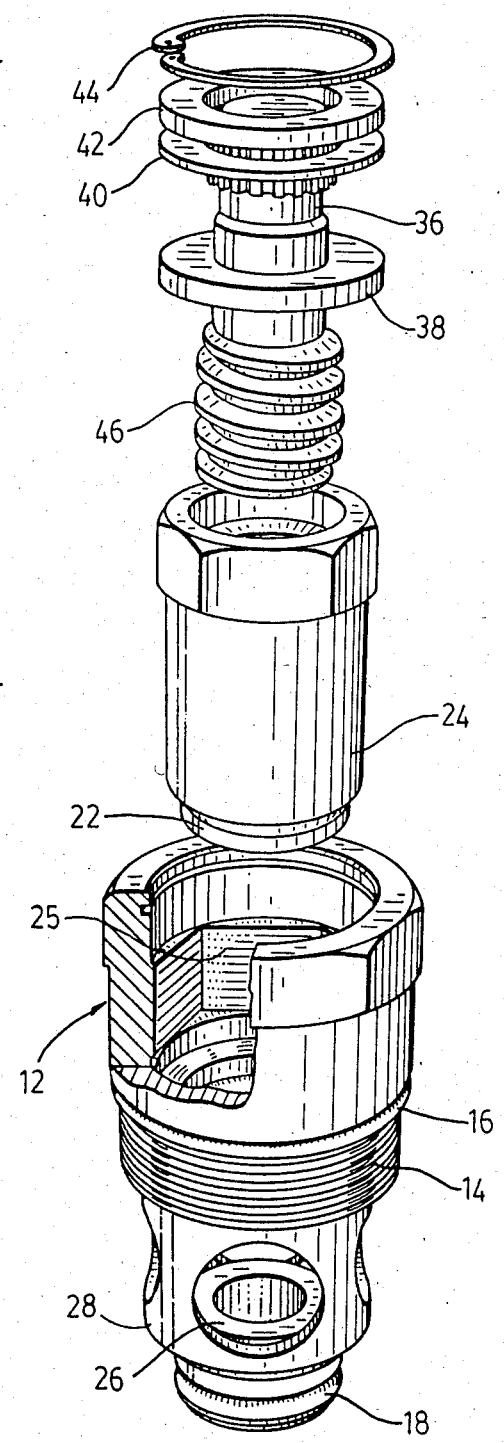
FIG. 3 is a perspective exploded view of the cartridge valve parts.

The stem 36 has a flange 38 that seats on a shoulder in the housing 12 as illustrated. It is maintained in its seat by a lubricating washer 40, a pressure washer 42 and a spring retaining ring 44. The lower end of the stem is threaded as at 46 and threadedly engages with the seal holder as shown in FIG. 2. The seal 22 is press fitted into the seal holder 24 by pressing it past the under-cut 48. The seal is resilient enough to compress as it passes the undercut and then to reassert itself as illustrated in the drawings to be retained by the seal holder. No screws are necessary to mount the seal 22 in the seal holder 24. The stem is rotatable within the cartridge valve housing to move the seal holder with which it threadedly engages longitudinally of the valve housing as will be expained more fully later.

The seating assembly 28 is sleeve-like in form and has an upper flange that sits against a shoulder in the housing as at 50. The seat assembly is inserted from the open top end of the cartridge valve housing as an initial step in production. The sides thereof are knurled and are driven into the opening at the bottom of the casing as at 52. Seal 18 previously mentioned seals against the seat extension of the faucet body. Thus, seals 16 and 18 serve to seal the cartridge against side walls of the faucet body in use.

The sleeve-like seating assembly is limited in its extension from the housing in a direction downwardly and axially of the lower end of the housing by the shoulder in the housing as at 50. This construction ensures that the seating assembly will be pulled from a faucet body together with the housing when the housing is removed. A person removing this cartridge does not therefor have to worry about the removal of a residual second portion of the valve assembly from the faucet housing.

It will be apparent from the description thus far that by turning the stem 36 one can cause the seal holder 24 to raise or lower whereby to cause the seal 22 to engage with or disengage from the annular sealing surface 26 of the seating member 28. In this way flow can be controlled through the faucet body.

Thus, closing of the valve is achieved essentially by an elastomeric seal carried by a seal holder that engages a stationary seat without rotation. The elimination of rotation of the seal in the closing of a valve in a cartridge of this type materially reduces wear on the sealing member.

The contact surface of the seat is annular in plan and provides a relatively large contact surface for a cartridge valve of this general type. With a relatively large contact area the seal is minimally indented when the seal is closed. This minimal distortion further reduces wear and has the advantage that as the valve is opened it does not significantly reassert itself as the compression is relieved to start flow. It will be apparent that in valves where there is more substantial compression of the sealing member the sealing member affects flow following initial opening as it reasserts itself with the release of compression. This phenomena is especially noticeable in a valve that controls hot water flow.

The seal arrangement illustrated has been found to be satisfactory because it has been found to give extraordinary long life. The design of the seal moving arrangement is such that in use, operation of the valve is stable and does not become sloppy. This is because as the valve opens there is always a force due to water pressure on the seal carrying assembly, tending to tighten all slack or looseness of the threaded engagement of the seal holder and stem in their axial direction. Any slack due to design tolerances or that might occur in the threading arrangement due to long use is taken up by the water pressure so that the valve never has a loose feeling in use. The valve is self adjusting.

In use the cartridge valve housing 12 is mounted in a faucet body 10 as described. A conventional handle is mounted on the free extending end of the stem 36 and the stem is rotated to seat and unseat the seal member 22 on its annular seating surface 26 whereby to stop and start flow through the faucet body in the direction of the arrows in FIG. 1.

It has been found that a faucet of this design will pass in excess of four and one half gallons of water per minute, at a line pressure of 20 p.s.i. flowing, with a seating surface 26 having an inside 0.36" diameter and that the threads 46 on the stem 36 can be designed with a pitch to move the seal holder 24 the full extent of its travel as indicated by the double headed arrow on FIG. 2 with one turn of the stem 36.

The outside diameter of the seating surface in such a valve was 0.575 inches giving an annular flat seating area of about 0.15788 square inches. A flat seating area of this size is very effective.

The sealing surfaces 26 and 22 have been illustrated as flat and flat surfaces are easiest to make. The requirement is that they be complementary. It will be apparent that there could be a deviation from the flat surfaces to say, a dished configuration, provided that they are complementary.

The cupped interior of the seal holder will contain lubricant for the stem. It will be noted that the lubricated portion of the stem is sealed by the O ring 34 from contact with water. In effect, the cupped interior of the seal holder 24 is a lubricant or grease chamber that is sealed from water by the O ring 34 on the outside of the seal holder 24. This is an efficient lubrication system for the stem and seal holder.

In use, when the cartridge valve assembly has become worn and must be replaced by another, the cartridge valve assembly can easily be removed from the faucet body as a single unit without concern that the components will seperate leaving parts within the faucet body that must be "fished" out. The inwardly directed shoulder, as shown at 50, of the housing provides a positive stop means for the seating assembly 28 and ensures that the seating assembly 28 will be withdrawn when the housing 12 of the valve assembly is removed.

It will be apparent that the embodiment illustrated is shown for exemplary purposes and that the scope of protection should not be so limited but extend to the invention as a whole as defined in the following claim.

We claim:

1. A cartridge valve assembly for mounting in a faucet body comprising:
   a housing having a main passage extending longitudinally therethrough from its upper end to its lower end;
   a seal holder reciprocably mounted for movement axially of itself in said main passage of the housing;
   an elastomeric seal with a sealing surface on the seal holder;
   a seat in the housing having a complementary annular seating surface for said seal;
   a stem mounted in the main passage of the housing for rotation but not axial movement;
   said stem and seal holder being in threaded engagement with each other whereby upon rotation of the stem in the housing the seal holder reciprocates in the housing and the seal can be caused to seat and unseat on the seating surface of the seat;

the housing having a through flow passage circumscribed by the annular surface of said seat only when the seal is unseated from said seat;

sealing means adjacent the upper end of said housing compressible upon mounting said cartridge valve assembly in a faucet body for sealing said cartridge valve assembly against the walls of a faucet body;

said seat being formed on a sleeve-like seating assembly; said seating assembly being contained by and extending downwardly and axially of the lower end of said housing; said sleeve-like seating assembly having an annular flange projecting outwardly therefrom; and inwardly directed locking shoulder formed on said main passage of said housing, said locking shoulder having a stop surface which extends in a plane at right angles to the longitudinal axis of the main passage of said housing, the portion of the main passage of the housing which extends from the upper end of the housing to the locking shoulder being proportioned to permit free movement of the sleeve-like seating assembly from the upper end of the housing to the point where the annular flange bears against the locking shoulder, said shoulder being a positive stop means to lock the seating assembly in the housing against separation therefrom in a direction downwardly and axially of the shoulder;

sealing means adjacent the lower end of said sleeve-like assembly compressible upon mounting said cartridge valve assembly in a faucet body for sealing the sleeve-like assembly of the cartridge valve assembly against the walls of a faucet body;

said stem having a round flange;

seating means on the interior of said housing for said round flange whereby said stem is mounted for rotation as aforesaid.

* * * * *